US008507861B2

(12) United States Patent
Girones et al.

(10) Patent No.: US 8,507,861 B2
(45) Date of Patent: Aug. 13, 2013

(54) RADIOLOGICAL CHARACTERIZATION DEVICE PROTECTED AGAINST PARASITIC IONIZING RADIATION SOURCES

(75) Inventors: Philippe Girones, Venejan (FR); Christophe Brenneis, Saint Victor la Coste (FR); Fabrice Lamadie, Connaux (FR); Christian Ducros, Pont Saint Esprit (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 93 days.

(21) Appl. No.: 13/256,199

(22) PCT Filed: Mar. 11, 2010

(86) PCT No.: PCT/EP2010/053104
§ 371 (c)(1),
(2), (4) Date: Sep. 12, 2011

(87) PCT Pub. No.: WO2010/103071
PCT Pub. Date: Sep. 16, 2010

(65) Prior Publication Data
US 2012/0012749 A1    Jan. 19, 2012

(30) Foreign Application Priority Data
Mar. 13, 2009 (FR) ...................................... 09 51594

(51) Int. Cl.
*G01T 1/00* (2006.01)
*G21K 1/02* (2006.01)
(52) U.S. Cl.
USPC ...................... 250/336.1; 250/363.1; 378/147

(58) Field of Classification Search
USPC ............................. 250/336.1, 363.1; 378/147
See application file for complete search history.

(56) References Cited

U.S. PATENT DOCUMENTS

| 3,107,276 | A | | 10/1963 | Cohen |
| 4,180,737 | A | * | 12/1979 | Kingsley ....................... 250/367 |
| 7,095,030 | B2 | | 8/2006 | Hughes et al. |
| 7,772,563 | B2 | | 8/2010 | Le Goaller |
| 2005/0230628 | A1 | | 10/2005 | Hirai et al. |

FOREIGN PATENT DOCUMENTS

| EP | 0674188 A1 | 9/1995 |
| FR | 2879304 A1 | 6/2006 |

OTHER PUBLICATIONS

International Search Report and Written Opinion in International Application No. PCT/EP2010/053104, mailed Jun. 9, 2010.
International Preliminary Report on Patentability in International Application No. PCT/EP2010/053104, mailed Sep. 13, 2011.

(Continued)

*Primary Examiner* — David Porta
*Assistant Examiner* — Mindy Vu
(74) *Attorney, Agent, or Firm* — Nixon Peabody LLP

(57) ABSTRACT

A radiological characterization device comprising at least one collimated radiological measuring probe, a sensitive end of which is placed in an exchangeable collimator having an opening and a field of observation. The collimator is carried by a collimator holder, the assembly consisting of collimator and collimator holder being inserted in a stack between two shielding screens, the shielding screens being exchangeable so as to adjust the thickness thereof, the assembly consisting of collimator and collimator holder and the shielding screens providing protection for the probe vis-à-vis parasitic ionizing radiation coming from ionizing radiation sources situated outside the field of observation of the collimator.

13 Claims, 10 Drawing Sheets

(56) References Cited

OTHER PUBLICATIONS

French Search Report in French Application No. FR 0951594, dated Jan. 28, 2010.

Vermeersch F. et al., "Characterization and Modeling of a Site by Combined Use of Radioactive Gamma Scanner Unidirectional EDR and Planning Tool VISIPLAN 3D," SFRP Codes Calculations in Radiation Protection, Radiation Physics and Dosimetry, Oct. 1-3, 2003, Sochaux, France, 11 pages. (Machine translation).

\* cited by examiner

RADIOLOGICAL CHARACTERIZATION DEVICE PROTECTED AGAINST PARASITIC IONISING RADIATION SOURCES

CROSS REFERENCE TO RELATED APPLICATIONS OR PRIORITY CLAIM

This application is a National Phase of PCT/EP2010/053104, filed Mar. 11, 2010, entitled, "DEVICE FOR X-RAY CHARACTERISATION PROTECTED AGAINST PARASITIC IONISING RADIATION SOURCES", and which claims priority of French Patent Application No. 09 51594, filed Mar. 13, 2009, the contents of which are incorporated herein by reference in their entirety.

TECHNICAL FIELD

The present invention concerns a phased array ultrasonic contact transducer.

Technical Field

The present invention concerns a radiological characterisation device protected against parasitic ionising radiation sources. Radiological characterisation means that it will be possible with the device, to make quantitative measurements, that is to say of dose rate, and measurements on the quality of radioelements present by means of spectrometry.

Work in hostile environments is frequent in the nuclear industry, in particular in operations of dismantling nuclear installations. These operations are of course framed by rules, practices and optimisation methods, for example by the application of the ALARA (as low as reasonably achievable) principle. This principle was established by the industry in order to reduce exposure to ionising radiation so that it is as low as possible having regard to economic and social factors. In practice, the technical operations depend on mastery of the context and more precisely the in situ radiological characterisation, that is to say knowledge of the level of concentration of the contamination and the location thereof as well as the quality of the radioelements present in a given place.

PRIOR ART

There exist radiological characterisation devices such as the ones described in French patent application FR 2 879 304, which associate a gamma camera with a collimated gamma spectrometry detector, the collimator having an observation field that is included in the observation field of the gamma camera. In this device, the collimator is fixed and surrounds the gamma spectrometry detector. The document "Characterisation and modelling of a radioactive site by combined use of the EDR unidirectional gamma scanner and the VISIPLAN 3D planning tool", F. Vermeersch et al, 2003, shows the use of a gamma analyser in which a gamma detector of the CsTi crystal type coupled with a photodiode is housed in a steel casing equipped on its front face with frustoconical shielding, this shielding being extended by a steel collimator. It is clear that, in order to reveal ionising radiation sources of very different levels, as can be found in buildings being dismantled, it is necessary to have available collimators of different interchangeable sizes.

A radiological characterisation device called Radscan 600 is also known, illustrated in FIG. 1 of the U.S. Pat. No. 7,095,030. The device has an inspection head that includes a video camera, a collimated gamma detector and a laser telemetry device. In this device the collimator is interchangeable. The drawback of this device is that, in operation, hot spots of lower intensity may be masked by more intense hot spots outside the field of observation of the collimator.

DISCLOSURE OF THE INVENTION

The aim of the present invention is to propose a radiological characterisation device that does not have the above limitations and difficulties, and in particular that is capable of characterising ionising radiation sources even of lower intensity in the presence of more intense ionising radiation sources without being interfered with by parasitic noise.

Another aim of the invention is to propose a radiological characterisation device with an adjustable collimator.

Another aim of the invention is to propose a radiological characterisation device with an interchangeable radiological measuring probe.

To achieve this, the present invention is a radiological characterisation device comprising at least one collimated radiological measuring probe, a sensitive end of which is placed in an interchangeable collimator having an observation field and an opening. The collimator is carried by a collimator holder and the assembly consisting of collimator and collimator holder is inserted in a stack between two shielding screens, the screens providing the shielding being exchangeable so as to adjust the thickness thereof, the assembly consisting of collimator and collimator holder and the shielding screens providing protection for the probe vis-à-vis parasitic ionising radiation coming from ionising radiation sources situated outside the observation field of the collimator.

Collimators having openings for different sizes may be housed in the collimator holder.

Advantageously, the measuring probe is also exchangeable.

The measuring probe may be a gamma spectrometry probe or a dose rate probe.

The radiological characterisation device preferably also comprises a removable probe holder in which the probe is placed, the probe holder, when it is housed in the collimator, making it possible to position the sensitive end of the probe in the collimator.

When the probe holder houses several probes, they are arranged in a bundle.

Advantageously, each shielding screen comprises one or more shielding plates; when there are several plates, they are in a stack. It is thus possible to adjust the thickness of the shielding screen.

The collimator can be substantially in a U shape with an opening and a base.

A shielding plate adjacent to the collimator may be bevelled in the vicinity of the collimator opening in order to increase the observation field thereof.

One of the shielding screens comprises a through hole in which the probe passes.

It is possible to provide means of locking the shielding screens in terms of rotation and translation with respect to the collimator holder and collimator.

The radiological characterisation device may also comprise a visible or infrared camera and/or a telemetry device secured to the locking means and/or a spotlight. They are very useful during the examination of complex scenes.

It is preferable also to provide means of locking the probe when it is in place in the collimator, so as to be able to move the characterisation device without any problems.

BRIEF DESCRIPTION OF THE DRAWINGS

The present invention will be better understood from a reading of the description of example embodiments given, for purely indicative and in no way limitative purposes, with reference to the accompanying drawings, in which.

The various configurations shown of the radiological characterisation device must be understood as not being exclusive of one another.

Identical, similar or equivalent parts of the different figures described below bear the same numerical references so as to facilitate passing from one figure to another.

The various parts shown in the figures are not necessarily shown according to a uniform scale, in order to make the figures more legible.

DETAILED DISCLOSURE OF PARTICULAR EMBODIMENTS

Figure 1A:
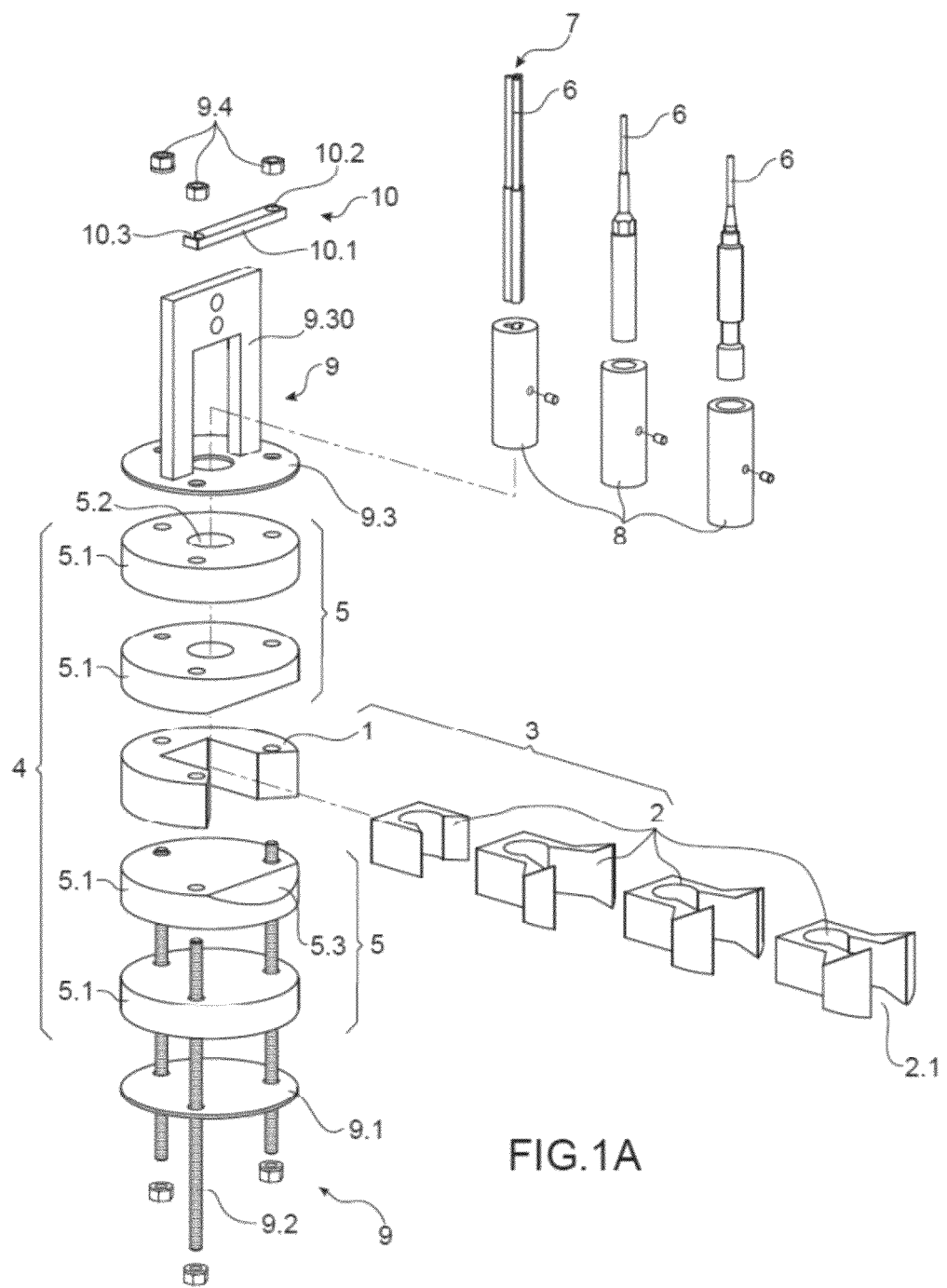
FIGS. 1A, 1B, 1C show respectively in exploded view, in cross section and assembled, an example of a radiological characterisation device that is the subject matter of the invention.
Figure 1B:
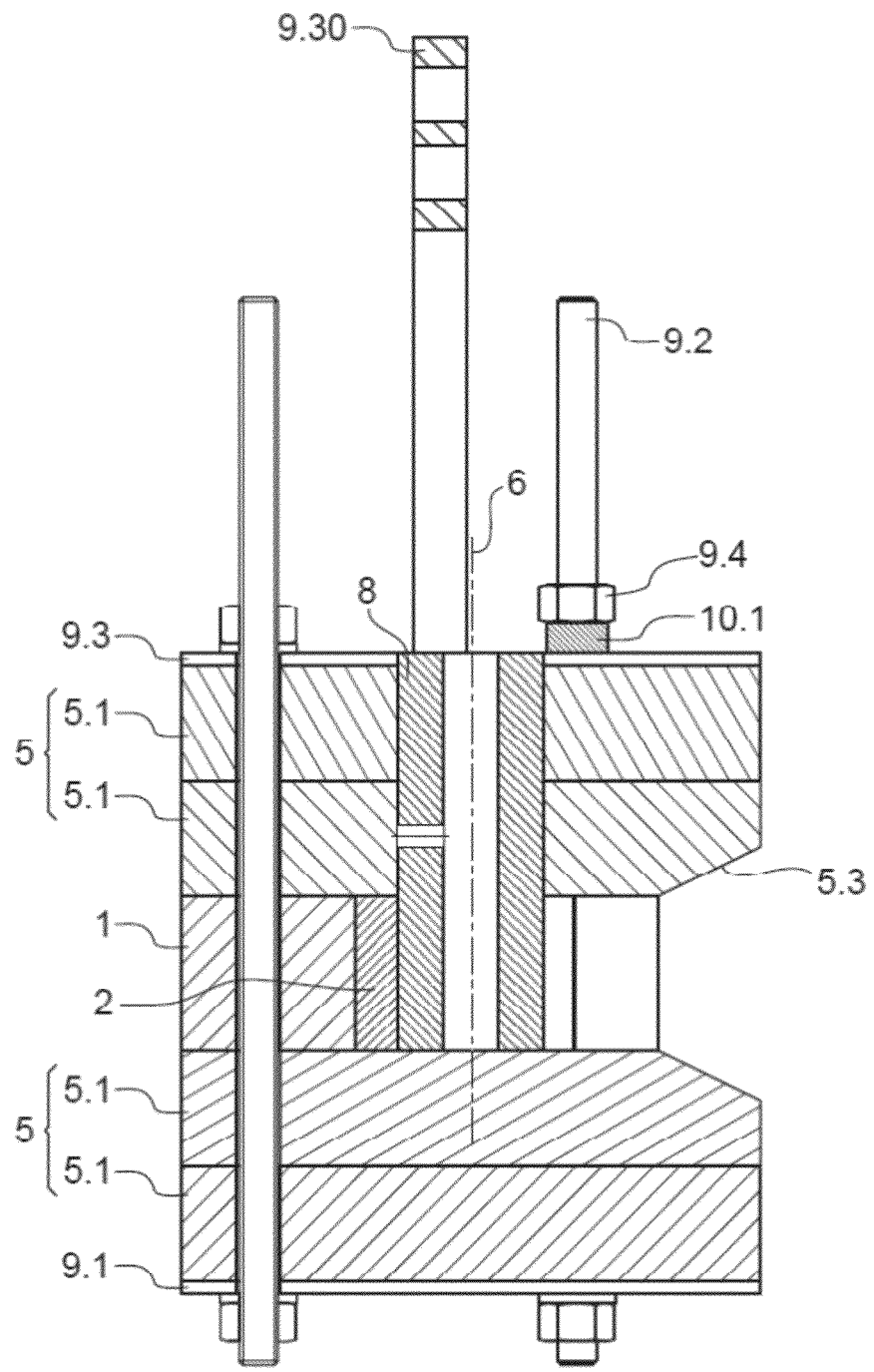

Reference will be made to FIG. 1A, which is an exploded view of an example of a radiological characterisation device according to the invention. FIG. 1B shows a transverse section of the same radiological characterisation device according to the invention. It comprises a collimator holder 1 intended to accept a collimator 2. The collimator 2 is substantially in a U shape with a bottom from which two arms start that contribute to delimiting the opening 2.1 of the collimator 2. The collimator holder 1 can be substantially in a U or C shape, the bottom of the U of the collimator being housed in the collimator holder 1. Thus the collimator 2 is exchangeable and the collimator holder 1 is able to accept collimators 2 having openings 2.1 of different sizes but the same base. FIG. 1A shows a set of four collimators 2 that can be installed on the collimator holder 1 each in their turn. These four collimators 2 have openings 2.1 of different sizes, corresponding for example to angles of between 10° and 90°, these angles being shown, in FIG. 1A, so as to decrease the further away they are from the collimator holder 1. The assembly formed by the collimator 2 mounted on the collimator holder 1, which will hereinafter be referred to as the collimation assembly 3, is sandwiched in a stack 4 between two shielding screens 5. The shielding screens 5 are preferably substantially flat. The shielding screens 5 are exchangeable, which makes it possible to adjust the thickness thereof according to the location of a gamma ionisation radiation source to be observed with respect to one or more adjacent gamma ionising radiation sources and considered to be parasitic. The ionising radiation sources are not shown.

The opening 2.1 of the collimator 2 is situated at one edge of the stack 4. The radiological characterisation device also comprises at least one radiological measuring probe 6 having a sensitive part housed in the collimator 2 at the bottom of the U, the opening 2.1 of the collimator 2 being free. This measuring probe 6 is also exchangeable. This measuring probe 6 may be a dose rate measuring probe, for example the probe SHI from the company Saphymo. In a variant, it may be a gamma spectrometry probe based on semiconductors such as for example CdZnTe. It is possible to use simultaneously several gamma spectrometry probes 6 arranged in a bundle 7 as will be seen subsequently. A probe holder 8 is preferably provided for positioning, with precision, the probe 6 (or the probes) in the collimator 2, which offers the possibility of using measuring probes 6 that do not have the same transverse sections. The probe holder 8 is removable and may take the form of a sleeve in which the measuring probe 6 or the bundle 7 of measuring probes is inserted, the assembly consisting of probe holder 8 and measuring probe 6 being housed in the collimator 2 at the bottom of the U. This probe holder 8 can be produced from a material such as copper, which makes it possible also to filter ionising radiations with the lowest energies.

The probe holder 8 can be associated with a given measuring probe 6; it has an outside transverse section that corresponds to the space delimited by the bottom of the collimator 2 and an inside transverse section that corresponds to the transverse section of the measuring probe 6 or of the bundle 7 of measuring probes. The assembly consisting of probe holder 8 and measuring probe 6 will hereinafter be referred to as the measuring assembly 11. The measuring assembly 11 bears on the shielding screen 5 fitting on top of the collimation assembly 3.

The two shielding screens 5 and the collimation assembly 3 protect the measuring probe 6 from any parasitic ionising radiation coming from ionising radiation sources placed outside the field of observation of the collimator 2. The two shielding screens 5 can each be formed by one or more plates 5.1; when there are several plates 5.1, they are in a stack. The shielding screens 5 and the collimator holder 1 will be produced from a material forming an obstacle to ionising radiation, such as lead for example. The collimator 2 can be made from tungsten for example.

One of the shielding screens 5 comprises a through hole 5.2 through which the measuring probe 6 passes, together with the probe holder 8 if such exists.

The number of shielding plates 5.1 is not necessarily the same on either side of the collimation assembly 3.

It is possible to provide that at least one shielding plate 5.1, the closest possible to the collimator 2, has a bevelled edge 5.3 at the opening 2.1 of the collimator 2 so as to increase the observation field of the collimator 2.

Locking means 9 can also be provided for locking the various constituents of the stack 4 with respect to both rotation and translation. The locking means 9 comprise a lower plate 9.1 from which three centring rods 9.2 project. They pass through the shielding screens 5 and the collimator holder 1. These centring rods 9.2 prevent rotation of one of the constituents of the stack 4 with respect to the others. The stack 4 rests on the lower plate 9.1. In the example three centring rods 9.2 have been shown.

These locking means 9 also comprise an upper plate 9.3 through which the centring rods 9.2 pass. It is intended to fit on top of the stack 4. Nuts 9.4 are also found, to be screwed onto the centring rods 9.2, which are threaded at least locally in order to hold the upper plate 9.3 pressed against the shielding screen 5 that it covers. Means 10 of locking the measuring probe 6 are also provided, which can take the form of a bar 10.1 one end of which is provided with a through hole 10.2 for fitting it onto one of the centring rods 9.2 and the other end of which is provided with a recess 10.3 intended to be fixed on the other centring rod 9.2. The bar 10.1, when it is in the locking position, is held pressed on the upper plate 9.3 by means of the nuts 9.4 that are screwed on the centring rods 9.2. It prevents the measuring probe 6 moving in translation.

The upper plate 9.3 can be provided with a handle 9.30 for facilitating movement of the characterisation device and the angular orientation of the collimator 2 and more particularly of the opening 2.1 thereof.

The stack 4 has been shown in the form of a cylinder of revolution but this is not limitative. The shielding screens 5 can in this case take the form of discs.

Figure 5A:
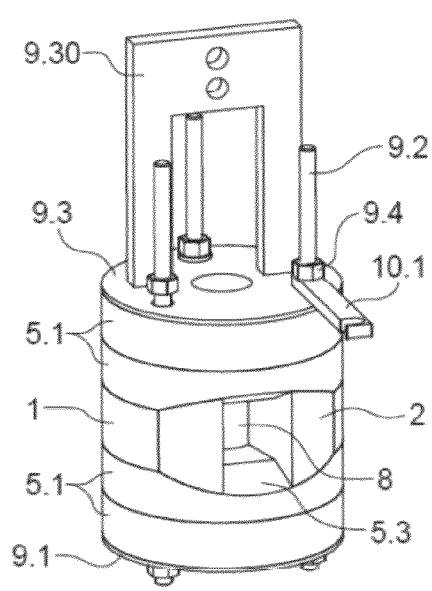
FIGS. 5A to 5C illustrate how to modify the concatenation of FIG. 4 for changing the measuring probe.
Figure 5B:
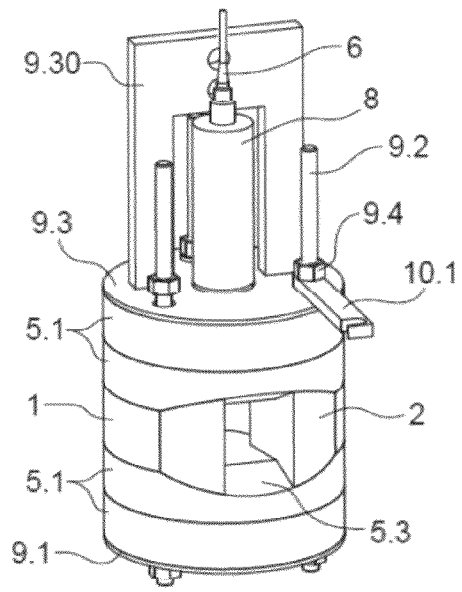
Figure 5C:
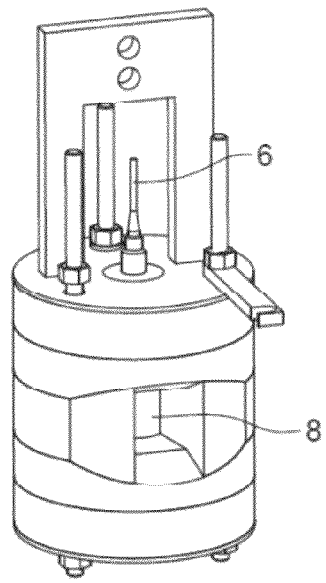

With such a device, it is easy to modify the number of shielding plates 5.1 according to the configuration of the space in which the radiological characterisation device that is the subject matter of the invention is used. It is thus possible to add shielding plates 5.1 between the lower plate 9.1 and the collimation assembly 3, if a very intense ionising radiation source (not shown) is situated under the device. It will of course be possible to add them between the upper plate 9.3 and the collimation assembly 3, if the very intense ionising radiation source is situated above the device. Thus the two shielding screens 5 do not necessarily have the same thickness, as illustrated in FIGS. 5A to 5C. They do not necessarily have the same number of shielding plates 5.1. It is also possible for the shielding plates 5.1 not all to have the same thickness. In FIGS. 5A to 5C, the shielding plate 5.1 that rests on the lower plate 9.1 is thicker than the others. This is only one example. The lengths of the centring rods 9.2 will be adapted according to the thickness of the two shielding screens 5 used.

Figure 1C:
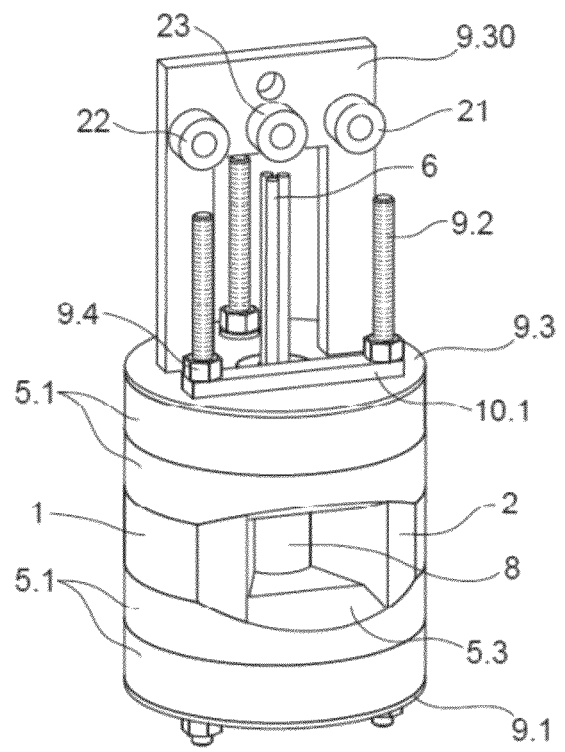

In FIG. 1C, the radiological characterisation device that is the subject matter of the invention is shown in three dimensions. It also comprises, shown on the handle 9.30 of the upper plate 9.3, an infrared or visible camera 21, in black and white or colours, and/or a telemetry device 22. The camera 21 makes it possible to take a visible or infrared photograph of the scene observed. The telemetry device 22 makes it possible to measure the distance separating the radiological characterisation device from an ionising radiation source observed. A spotlight reference 23 illuminates the scene.

The efficacy of a collimation assembly 3 with a collimator 2 having an opening, that is to say an aperture, of 90° has been verified by means of a series of calculations using the MERCURE advanced computing code 6.2. This is a computing code for evaluating, for an ionising radiation source having a given energy, the gamma fluence rate at the detector. It will be recalled that fluence is, at a given point in space, the quotient of the number of particles that, in a given interval of time, enter a suitably small sphere centred at this point, divided by the area of the great circle of this sphere. The fluence rate is the quotient of the variation in the fluence divided by the unit of time.

Figure 2A:
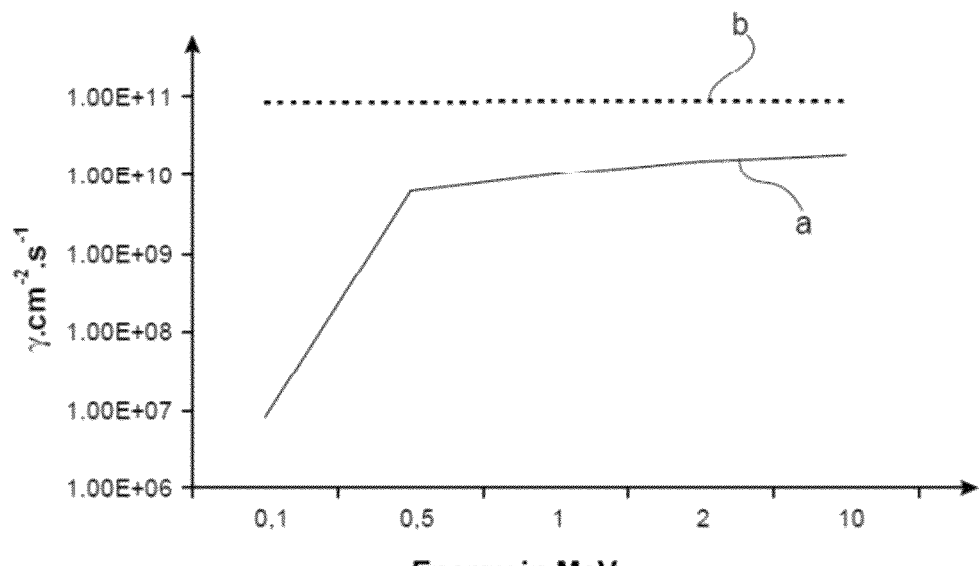
FIG. 2A is a graph illustrating the fluence rate acquired by the measuring probe as a function of the energy of the ionising radiation source observed, and FIG. 2B a graph illustrating the signal to noise ratio afforded by the collimator as a function of the energy of the ionising radiation source observed.

The ionising radiation source has a large volume, 10 metres by 6 metres by 2 metres. The dose rate measuring probe is placed at 1 metre from the ionising radiation source. The ionising radiation source has been given five discrete energy values, namely 100 keV, 500 keV, 1 MeV, 2 MeV and 10 MeV. These fluence rate calculations have been made with the radiological characterisation device of the invention, the collimator being in place or absent. The graph in FIG. 2A shows the fluence rate as a function of the energy of the ionising radiation source, the curve referenced (b) corresponding to the case where the collimator is absent in the characterisation device and the curve referenced (a) corresponds to the case where the collimator is present in the characterisation device. The calculations made with the collimator show that the fluence rate varies as a function of the energy of the source. Without the collimator, the fluence rate is substantially constant.

Figure 2B:
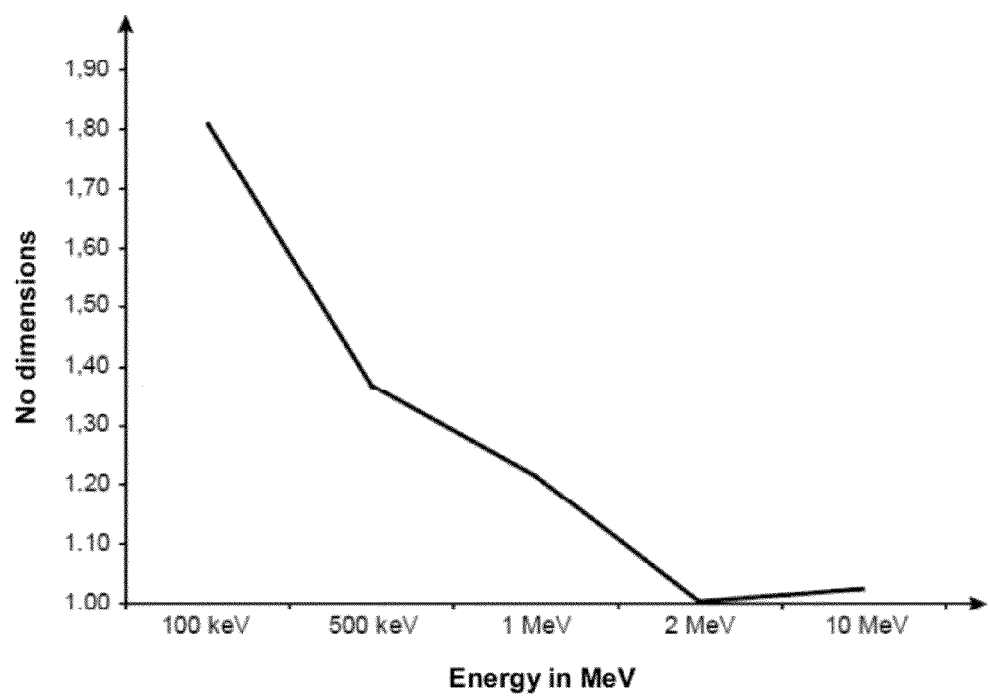

Still using the same ionising radiation source and the radiological characterisation device that is the subject matter of the invention, it was attempted to evaluate the signal to noise ratio afforded by the collimation assembly. Reference is made to FIG. 2B. For each of the discrete energies mentioned above, the fluence was calculated, in a first configuration, in which the ionising radiation source is situated in the field of observation of the collimator and, in a second configuration, in which the ionising radiation source is situated strictly outside the field of observation of the collimator. The signal to noise ratio is a quantity that is proportional to the ratio of the values calculated in the first configuration to the values calculated in the second configuration. The signal to noise ratio varies from approximately 2 to approximately 1 and decreases as the energies increase. The MERCURE computing code standardises the source to a volume activity of 1 Bq/cm$^3$.

Figure 3A:
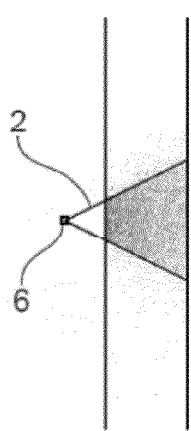
FIGS. 3A, 3B illustrate, in plan view, the collimation power of the collimator of the radiological characterisation device of the invention, comparing it with a radiological characterisation device without a collimator.
Figure 3B:
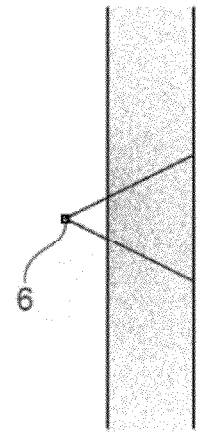

FIG. 3 show a modelling of the flux acquired by the measuring probe in the case where the collimator is present (FIG. 3A) and in the case where it is absent (FIG. 3B). The radiological characterisation device is shown partially in plan view. The flux acquired by the measuring probe 6 is much smaller when the collimator is present.

Figure 4A:
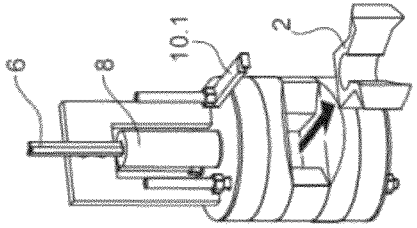
FIGS. 4A to 4H illustrate the procedure to be applied for changing the collimator of the radiological characterisation device of the invention.
Figure 4E:
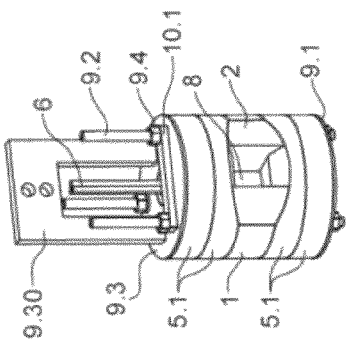
Figure 4B:
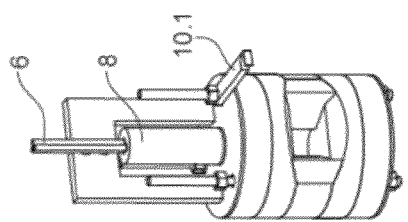

It will now be shown, with reference to FIGS. 4A to 4H, how it is possible to change collimator 2. In FIG. 4A, the radiological characterisation device comprises a collimator 2 with a large observation field. It also comprises three measuring probes 6 arranged in a bundle 7. In FIG. 4B, the measuring assembly 11 has been unlocked, by releasing the bar 10.1 of one of the centring rods 9.2.

Figure 4F:
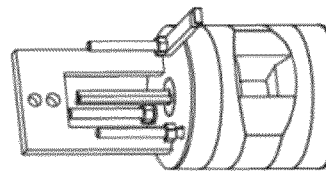
Figure 4C:
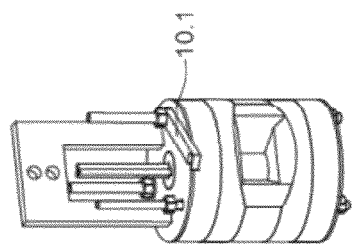
Figure 4G:
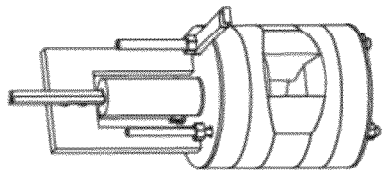
Figure 4D:
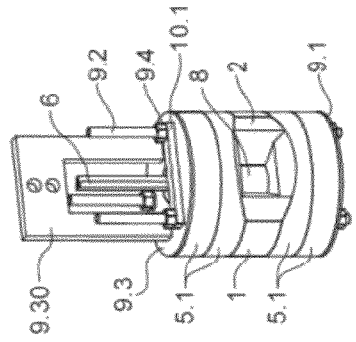
Figure 4H:
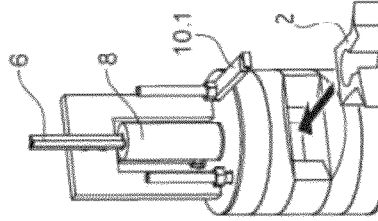

In FIG. 4C, the measuring assembly 11 as been extracted from the collimator 2 by lifting it. The measuring assembly 11 can be left inserted in the shielding screen 5 having the through hole 5.2. In FIG. 4D, the collimator 2 has been extracted from the collimator holder 1 by pulling it like a drawer. In FIG. 4E, a new collimator 2 is housed in the collimator holder 1 by pushing it like a drawer. In FIG. 4F, the new collimator 2 is in place. It has a smaller observation field than the one that was removed. In FIG. 4G, the measuring assembly 11 has been put back in place by lowering it into the upper shielding screen 5 and the collimator 2 until it abuts on the other shielding screen 5 on which the collimation assembly 3 rests. All that remains is to put the locking bar 10.1 back in place as indicated in FIG. 4H. If it is wished to change the measuring probe 6, it is possible to perform the following operations. The operations described in FIGS. 4A to 4C are performed. Then the measuring assembly 11 is removed completely as in FIG. 5A and is replaced by another one as in FIGS. 5B, 5C. In FIG. 5C, the new measuring assembly 11 is in place. All that remains is to put the locking bar 10.1 back in place as indicated in FIG. 4H. It is of course possible, in a succession of steps, to combine both the changing of the collimator 2 and the changing of the measuring assembly 11.

The measuring probe 6 receives the gamma spectrum emitted by the ionising radiation source (not shown). The signals supplied by the measuring probe in response to the gamma spectrum received make it possible to estimate the flux rate or the activity of each radioelement emitting ionising radiation present in the spectrum. Thus the interpretation of the gamma spectrum makes it possible, for example during a phase of cleaning a room, to monitor "in line" each radioelement present in the spectrum received.

Figure 6A:
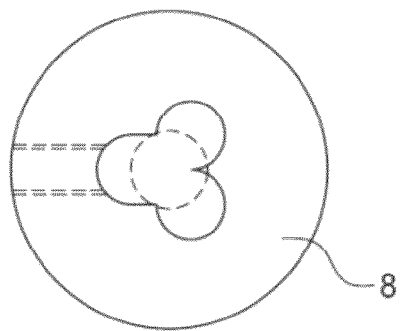
FIGS. 6A, 6B, 6C illustrate various probe holders in transverse section.
Figure 6B:
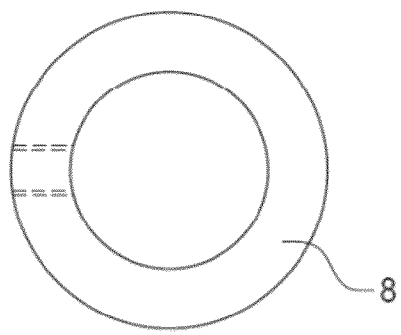
Figure 6C:
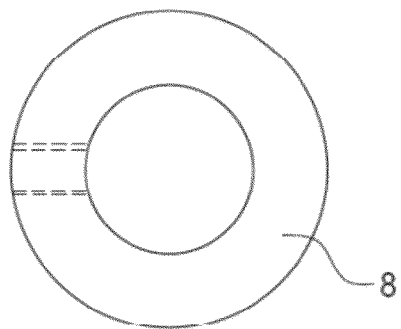

FIGS. 6A, 6B, 6C show transverse sections of several probe holders 8. The probe holders are cylinders of revolution the outside diameter of which is the same whatever the probe that it will accept. The probe holder 8 in FIG. 6A is intended to accept a bundle of several spectrometry measuring probes; in the example, three of these are provided (as illustrated in FIG. 4A for example) but this number is not limitative. The three probes may be the same or have different volumes. It would be possible for example to provide probes with increasing volumes, for example of 1 mm$^3$, 5 mm$^3$ and 60 mm$^3$. The measurements made cover a large measuring dynamic range. In a variant, it is possible to use probes with the same volume and to sum the gamma radiation spectra acquired by each of the probes. The latter configuration makes it possible to keep the resolution of the detection using a low-volume detector while increasing the efficiency compared with the case where a single triple-volume probe is used. In FIGS. 6B and 6C the probe holder 8 is intended to accept a single probe, the volume of the probe having to be placed in the probe holder of FIG. 6B is larger than that of the measuring probe that is to be placed in the probe holder in FIG. 6C.

The radiological characterisation device that is the subject matter of the invention can be used by directly exploiting the signals delivered by the measuring probe or probes and providing the processing of these signals "in line" by means of a simple report or table. An absolute measurement method is used. The radiological characterisation device is moved over at least one vertical in front of the scene to be characterised, hanging it from a pole and giving it one or more angular orientations per height. According to the signals delivered, it is possible to change the collimator, the thickness of one or other or both shielding screens or even the measuring probe.

Figure 7A:
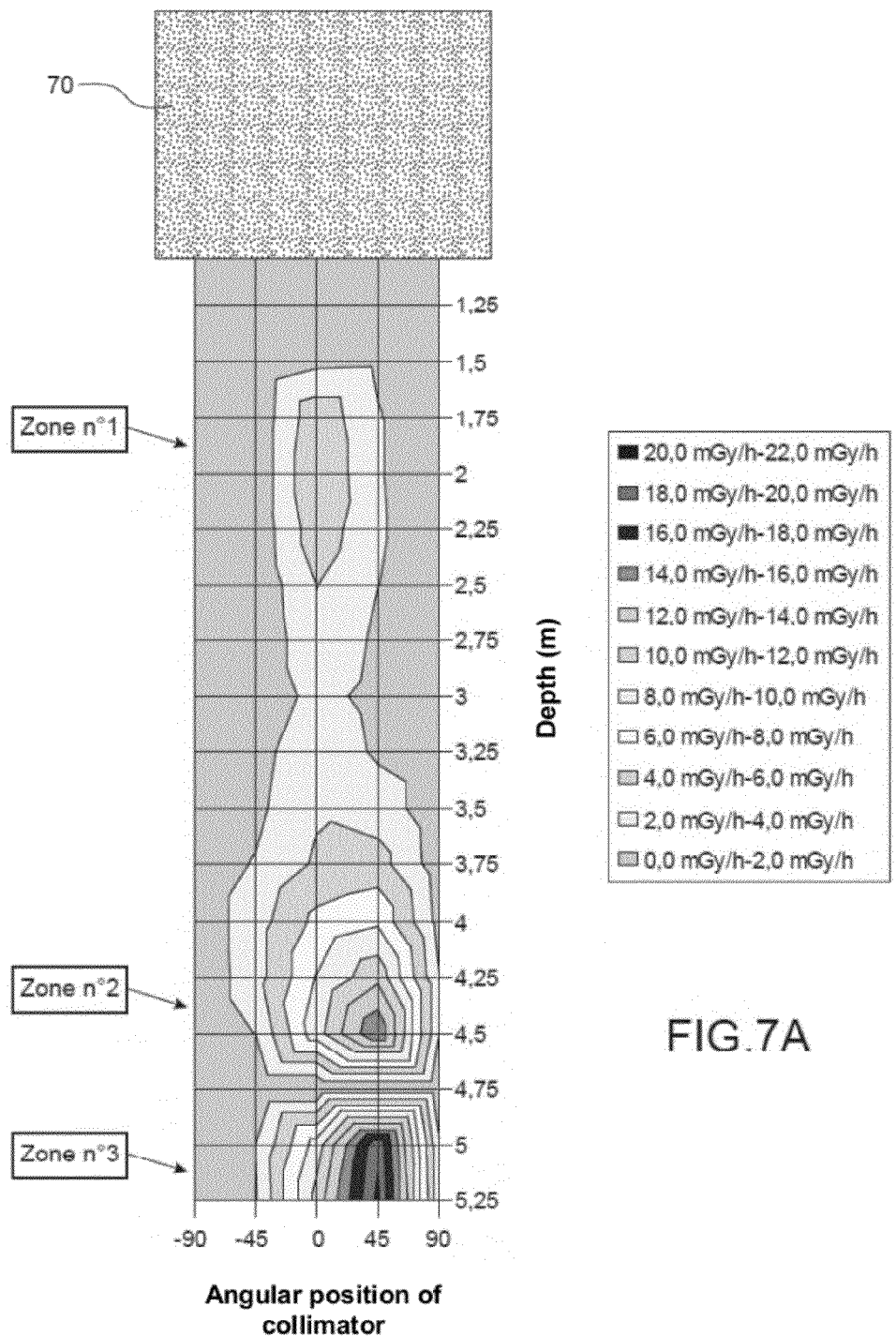
FIGS. 7A, 7B, 7C are mappings of dose rate of a casing in which a vessel is situated that contains or has contained fission product solutions, this casing being subjected to a cleaning procedure.

In a variant, it is possible to carry out a posteriori processing. A relative measurement method is used. For a given ionising radiation source and a given collimator, a mapping of the scene observed will be drawn up in terms of dose rates. A definition will be made of the orientation angles that will be given to the characterisation device and therefore to the measuring probe, on either side of a zero angle in which the axis of sight of the collimator is substantially normal to the scene observed. A plurality of heights are also defined. For example, a measurement is made of the dose rate for a given height and a certain number of orientation angles. It is thus possible to trace a first mapping as illustrated in FIG. 7A. It delimits contamination and concentration points or regions. If the scene is then cleaned, it is possible to proceed with the finishing of this cleaning and a new series of measurements, and the formation of a new mapping with the same heights and the same angles in order to assess the efficacy of the decontamination. It is also possible, by changing the measuring probe in order to use a gamma spectrometry probe, to estimate the quality of the radio elements observed. It is then possible to couple the dose rate mapping with the gamma spectrum in order to estimate the activity of the scene observed.

Figure 7B:
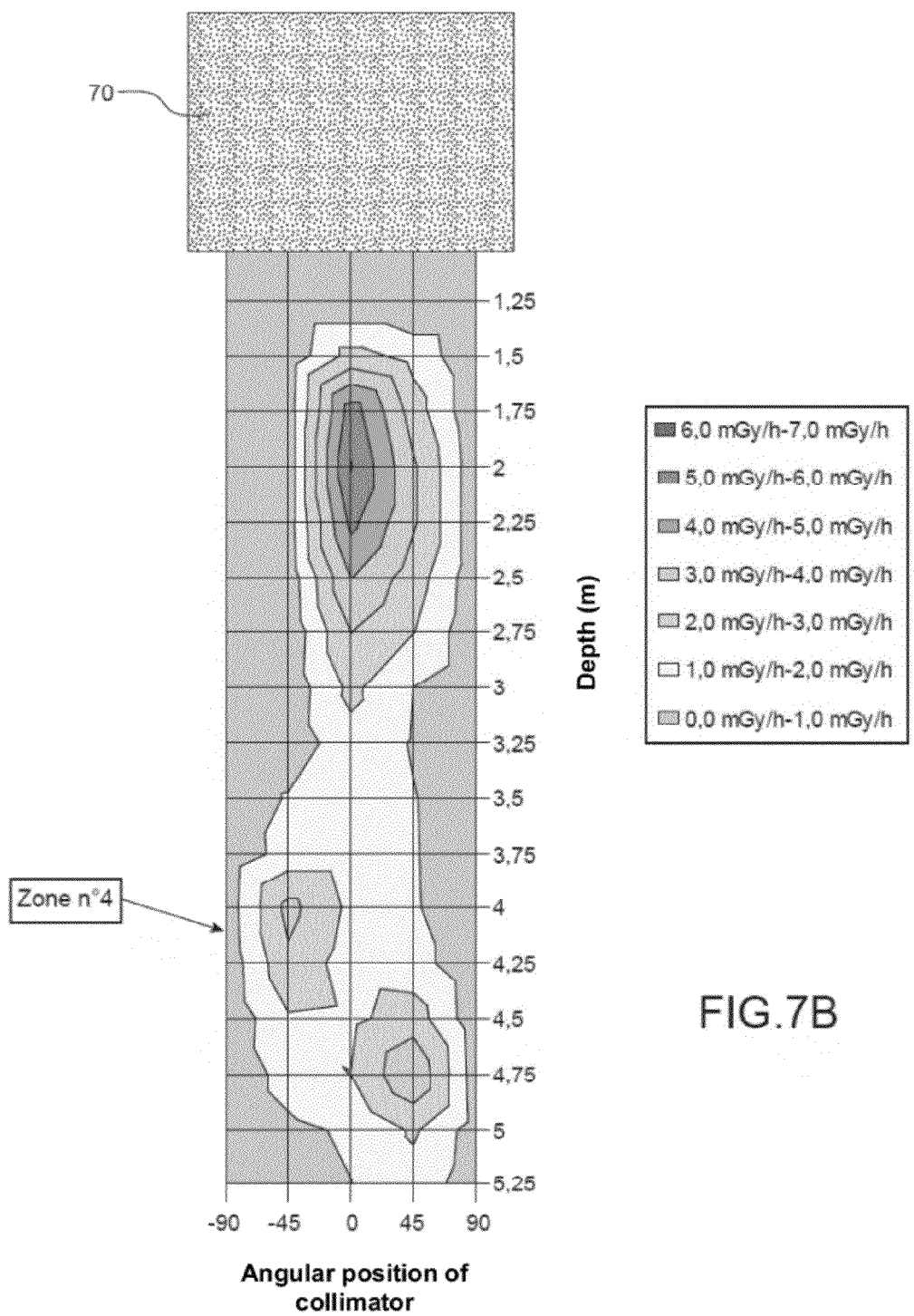
Figure 7C:
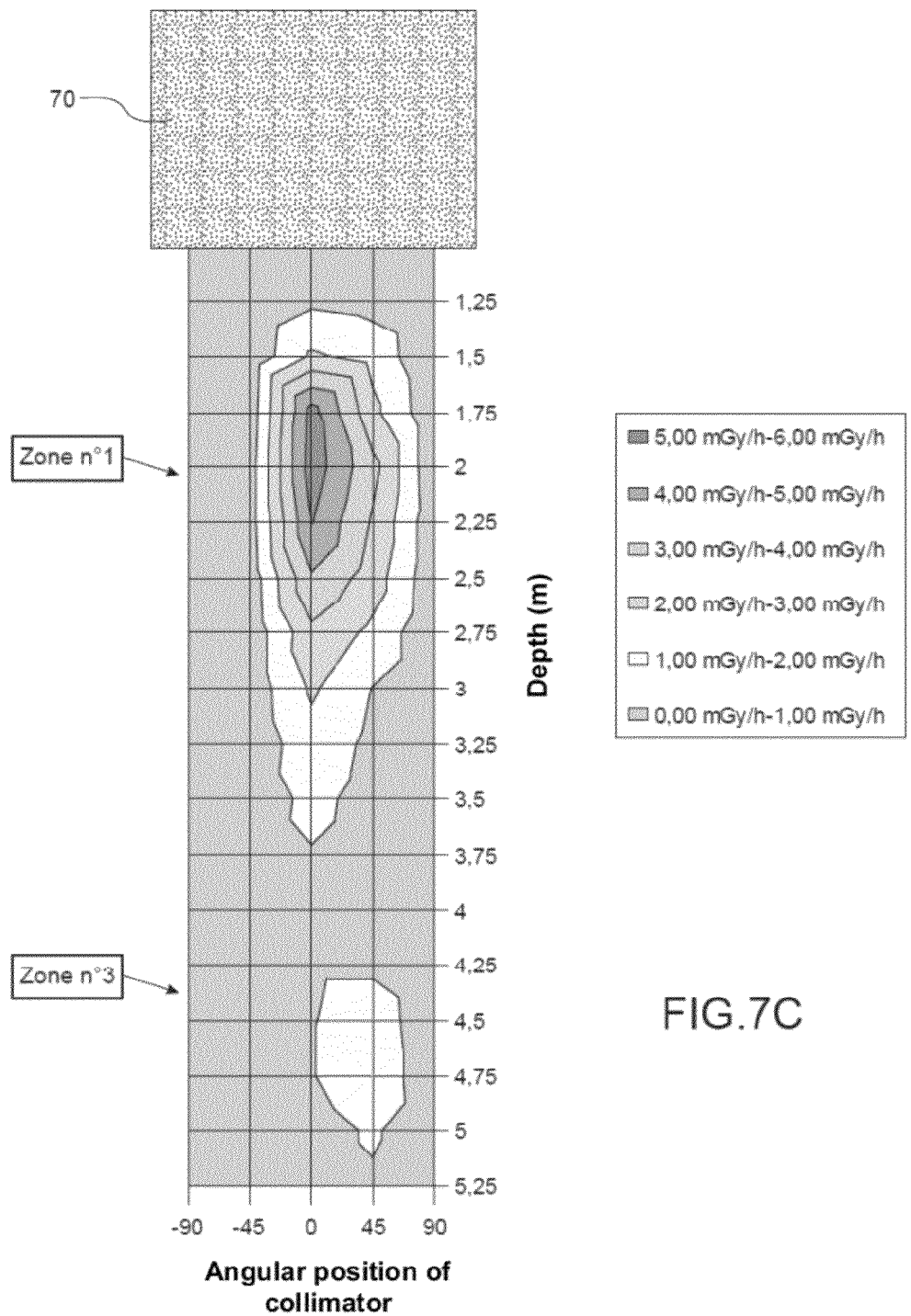

FIGS. 7A, 7B and 7C are dose rate mappings of a casing containing a vessel for collecting and storing fission product solutions. The measurements were made at depths of between −1 metre and −5.25 metres. Scanning was carried out over a range of angles from −90° to +90°. The casing is situated in the basement of a building under a concrete slab 70. These mappings correspond to a state just before the start of the cleaning (FIG. 7A), to a state during cleaning (FIG. 7B) and to a final state of the cleaning (FIG. 7C).

In FIG. 7A, three zones can be seen for which the contamination level is high. These are a zone no. 1, close to the ceiling, an intermediate zone no. 2 and a casing-bottom zone no. 3. Zone no. 1 is attributed to a pipe such as a sample-taking pot. Zone no. 2 is attributed to an internal part of the vessel of the ejector type or as being a marling zone. Zone no. 3 is attributed to the bottom of the vessel that still contains active solutions.

In FIG. 7B, it can be seen that the dose rates have decreased at least for zones 2 and 3. The inspection takes place when cleaning operations have begun and the vessel has been emptied. A new intense contamination zone, called zone 4, has appeared in the left-hand part of the map, at a height of between approximately −3.75 and −4.5 metres. It corresponds to pipes used for emptying the vessel. Zone no. 1 is still present since the sample-taking pot has not been treated.

The cleaning operations have continued, the vessel has been rinsed and the efficacy of the rinsing cannot be denied in FIG. 7C. Zone no. 4 has disappeared, the intensity of zone no. 3 has decreased. Only zone no. 1, which has not been decontaminated, remains intensely. The results of the mapping and the reports on efficacy of contamination are convincing and precise.

It will be understood that various changes and modifications can be made to the radiological characterisation device without departing from the scope of the invention.

The invention claimed is:

1. Radiological characterization device comprising at least one collimated radiological measuring probe, a sensitive end of which is placed in an exchangeable collimator with an observation field, characterized in that the collimator is carried by a collimator holder, the assembly consisting of collimator and collimator holder being inserted in a stack between two shielding screens, the shielding screens being exchangeable so as to adjust the thickness thereof, the assembly consisting of collimator and collimator holder and the shielding screens providing protection of the probe vis-à-vis parasitic ionizing radiation coming from ionizing radiation sources situated outside the field of observation of the collimator, the collimator being substantially in a U shape with an opening and a bottom at which the sensitive end of the measuring probe is housed.

2. Radiological characterization device according to claim 1, in which the collimator holder is intended to house collimators having openings of different sizes.

3. Radiological characterization device according to claim 1, in which the measuring probe is exchangeable.

4. Radiological characterization device according to claim 1, in which the measuring probe is a gamma spectrometry probe or a dose rate probe.

5. Radiological characterization device according to claim 1, also comprising a removable probe holder in which the probe is placed, the probe holder, when it is housed in the collimator making it possible to position the sensitive end of the probe in the collimator.

6. Radiological characterization device according to claim 5, in which, when the probe holder houses several probes, they are arranged in a bundle.

7. Radiological characterization device according to claim 1, in which each shielding screen comprises one or more shielding plates, and when there are several plates are in a stack.

8. Radiological characterization device according to claim 7, in which a shielding plate adjacent to the collimator has a bevelled edge close to the opening of the collimator in order to increase its field of observation.

9. Radiological characterization device according to claim 1, in which one of the shielding screens comprises a through hole through which the probe passes.

10. Radiological characterization device according to claim 9, comprising also a removable probe holder, wherein the probe holder passes through the through hole.

11. Radiological characterization device according to claim 1, also comprising means of locking the shielding screens rotationally and translationally with respect to the collimator holder and the collimator.

12. Radiological characterization device according to claim 11, also comprising a visible or infrared camera and/or a telemetry device secured to the locking means and/or a spotlight.

13. Radiological characterization device according to claim 1, also comprising means of locking the probe when it is in place in the collimator.

\* \* \* \* \*